Patented Dec. 18, 1928.

1,695,643

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

ARTIFICIAL FIBER AND PROCESS OF MAKING SAME.

No Drawing. Application filed March 22, 1924, Serial No. 701,029. Renewed October 9, 1926.

This invention relates to artificial fibers, and particularly to those made of chlorinated rubber. This application is a continuation in part of my co-pending application 480,565, filed June 27, 1921 (now Patent 1,544,529, June 30, 1925).

Ordinary rubber, in the unvulcanized condition will combine with chlorine as set forth in co-pending applications, to form a product which is much more soluble than the original rubber, and differs from it materially in other respects. Such products may contain from 40% to 67% or more of combined chlorine, with a corresponding variation in properties. All grades lack the extensibility of rubber, and are considerably harder and more brittle, particularly in the more highly chlorinated varieties, thus bearing a considerable resemblance to resins. Chlorinated rubber, however, is characterized by a degree of toughness and flexibility seldom approached by resins.

Raw rubber, when treated with solvents, such as benzol, carbon bisulfide, and the like, swells very greatly, and forms a viscous solution or jelly-like mass. A solution such as that described gives up its solvent only very slowly, and remains tacky for an indefinite period. If an attempt is made to form fibers by extruding a viscous rubber solution or jelly from an orifice, the reluctance with which the material gives up its solvent prevents the formation of a fiber of sufficient strength to be handled, and the tacky nature of the extruded material adds to the difficulty.

Resins such as the usual varnish resins, which may have been "run" to render them soluble in volatile solvents, shellac, or various synthetic resins do not readily assume a jell or dough-like consistency when treated with solvents, and moreover their very brittle nature unsuits them for use in preparing fibers.

Chlorinated rubber dissolves readily and solutions of any desired consistency are easily prepared. By forcing a very viscous, dough-like solution through a fine orifice by means of pressure, a fiber is extruded which, because of the unique properties of the material, rapidly loses much of its solvent, and is sufficiently tough and strong to be carried away from the orifice and spun to indefinite length. These fibers or threads are only very slightly extensible under tension, but when bent double between the fingers, they resume their original longitudinal position without indications of creasing. The fibers are not tacky, and do not stick together when wound on a spool or bobbin. They may be colored by the addition of dye, soluble in the solvent employed.

The less highly chlorinated grades of chlorinated rubber are preferable for some purposes, yielding fibers having considerable strength and flexibility. The more highly chlorinated varieties, while yielding less strong, and stiffers fibers, impart a high lustre and are useful for some purposes.

Carbon bisulfide is a good solvent for chlorinated rubber and has the advantage over heavier solvents, in making fibers, that after extrusion the fiber sets quickly, and the residual solvent evaporates rapidly. However two or more threads may be wound, twisted or braided together while some of the solvent is still present, so as to cause adherence, and thus to make a strong compact strand. Under some conditions less volatile solvents are desirable, and benzol, toluol, and the like may be utilized. A small quantity of unchlorinated rubber, for example, 10% may be added in some cases to modify the set, adhesion or other properties.

In one modification of the invention, the extruded fiber may be immersed in a liquid material which will precipitate the chlorinated rubber, and remove its solvent. Such materials as alcohol, acetic acid, gasoline and the like are suitable for this purpose. Fibers treated in this way are not lustrous.

As an example of one mode in which this invention may be carried out, a 15% solution of chlorinated rubber in carbon bisulfide, was evaporated until of a thickish almost jelly-like consistency. It was then forced through a fine glass orifice by means of high pressure (from a $CO_2$ cylinder) and as the material extruded it was carried forward at the same rate of speed, producing a fine thread or fiber. The latter could be made of indefinite length without breakage. Under the microscope the fiber was found to be quite uniformly circular in cross section, and possessing a fair degree of lustre. These threads could be braided together into a web or fabric.

Softeners, such as diethyl phthalate, triphenyl and tricresyl phosphate, highly chlorinated hydrocarbons, camphor mixtures and other solid solvents for chlorinated rubber may be incorporated with the solution before extrusion, to modify the properties of the fibers. These materials are useful in decreasing the stiffness of the fibers, and rendering them more limp and tough.

Single or composite threads may be used for making fabrics, etc., which are resistant to water, and are relatively slow burning or non-inflammable. Some may be prepared very lustrous, like silk, others are dull, giving a softer effect. Pieces of larger dimensions than fibers or threads may be extruded, e. g. rods, or rod shaped bodies such as tubes, and are included within the scope of this invention.

In the foregoing and in the appended claims chlorinated rubber is referred to but it is to be understood that the use along with chlorine of bromine or other halogens in making a chlorinated product also having other halogens in combination is not precluded since included within the purview of this invention are chlorinated rubber products or chlorinated rubber derivatives which may contain other elements than simply chlorine, carbon and hydrogen, all to such extent as such products function in a manner similar or analogous to true chlorinated rubber. Likewise in place of natural rubber artificial rubber may be employed in some cases as a basis for halogenation; or gutta percha, balata, etc. may be utilized.

What I claim is:—

1. The process of making fibers which comprises forming a concentrated solution of chlorinated rubber into the shape of a fiber and removing the solvent therefrom.

2. The process of making a fiber which comprises forming a concentrated solution of chlorinated rubber, adding a softener, shaping into a fiber, and removing the solvent therefrom.

3. The process of making fibers, which consists of forming a solution of chlorinated rubber in a volatile solvent into the shape of a fiber and removing the solvent therefrom.

4. As a new product, an artificial thread comprising chlorinated rubber.

5. As a new product, an artificial thread comprising chlorinated rubber and a softener.

6. An artificial thread containing chlorinated rubber as an essential constituent of its composition.

7. As a new product, an artificial thread comprising chlorinated rubber, such thread having a dull finish.

8. Artificial fiber composed of composition including a chlorinated organic material as its principal component, such fiber being substantially non-combustible.

CARLETON ELLIS.